United States Patent [19]
Schmidt

[11] Patent Number: 5,234,632
[45] Date of Patent: Aug. 10, 1993

[54] AERATION APPARATUS FOR LIQUID

[75] Inventor: Hans Schmidt, Liebenburg, Fed. Rep. of Germany

[73] Assignees: Berthold Schreiber; Erhard Schreiber, both of Fed. Rep. of Germany

[21] Appl. No.: 783,687

[22] Filed: Oct. 30, 1991

[30] Foreign Application Priority Data

Dec. 6, 1990 [DE] Fed. Rep. of Germany ...... 4038940

[51] Int. Cl.$^5$ .................................................. B01F 3/04
[52] U.S. Cl. ............................ 261/122.2; 210/221.2; 210/220
[58] Field of Search ................ 261/122, 100, 122.2; 210/220, 221.1, 221.2

[56] References Cited

U.S. PATENT DOCUMENTS

| | | | |
|---|---|---|---|
| 3,953,553 | 4/1976 | Thayer | 261/122 |
| 4,060,486 | 11/1977 | Schreiber | 261/122 |
| 4,118,447 | 10/1978 | Richter | 261/122 |
| 4,165,286 | 8/1979 | Schreiber | 261/122 |
| 4,640,803 | 2/1987 | Schmidt-Kufeke | 261/122 |
| 4,818,446 | 4/1989 | Schreiber | 261/122 |
| 4,954,296 | 9/1990 | Ott | 261/122 |
| 4,960,546 | 10/1990 | Tharp | 261/122 |
| 5,013,493 | 5/1991 | Tharp | 261/122 |
| 5,059,358 | 10/1991 | Tharp | 261/122 |

FOREIGN PATENT DOCUMENTS

| | | |
|---|---|---|
| 3319161 | 11/1984 | Fed. Rep. of Germany ...... 261/122 |
| 3418548 | 11/1985 | Fed. Rep. of Germany ...... 261/122 |
| 3536507 | 4/1987 | Fed. Rep. of Germany ...... 261/122 |
| 3624580 | 2/1988 | Fed. Rep. of Germany ... 261/122.2 |
| 3639473 | 5/1988 | Fed. Rep. of Germany ... 261/122.2 |
| 3819305 | 7/1990 | Fed. Rep. of Germany ... 261/122.2 |

Primary Examiner—Thomas M. Lithgow
Attorney, Agent, or Firm—Bell, Seltzer, Park & Gibson

[57] ABSTRACT

An apparatus for injecting compressed air into a liquid comprises a tubular basic body such as a pipe that is surrounded by a perforated membrane through which air is distributed into wastewater and is connected to the nipple of a compressed air supply through a hollow and cylindrical member that transfers compressed air to the space between the membrane and the tubular basic body and also has a passageway for wastewater so that wastewater can flow through the tubular basic body, thereby avoiding stagnant areas of untreated wastewater.

14 Claims, 2 Drawing Sheets

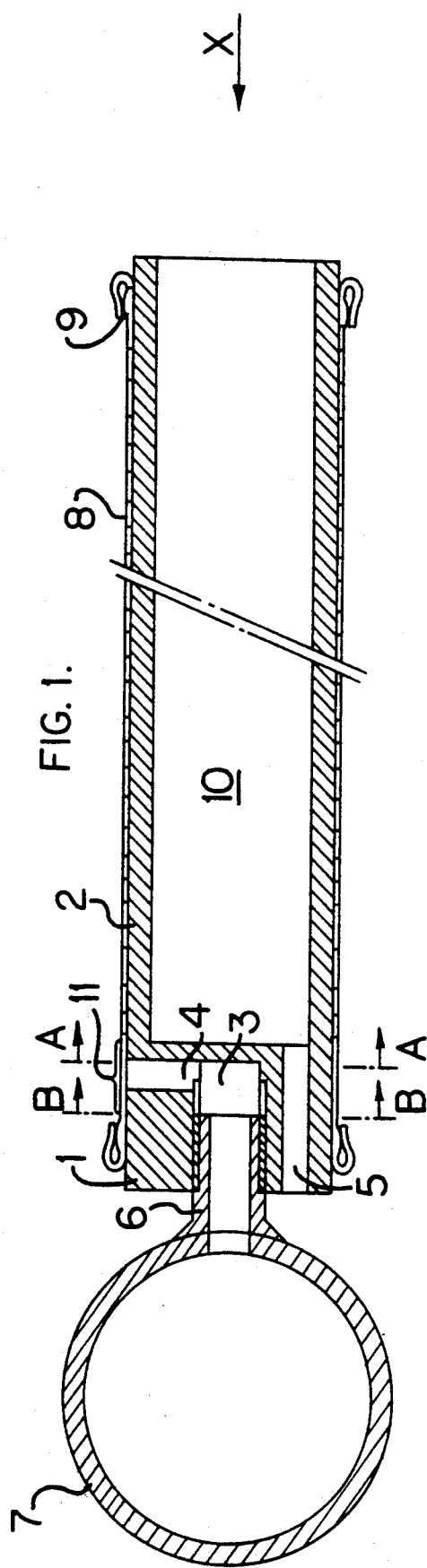
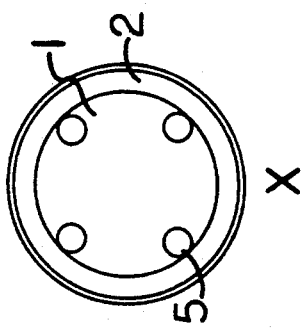
FIG. 4.
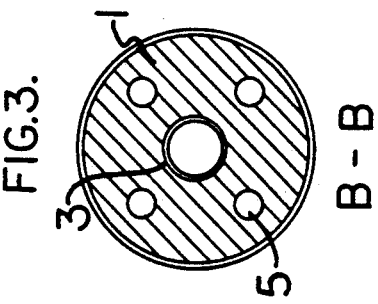
FIG. 3.
B-B
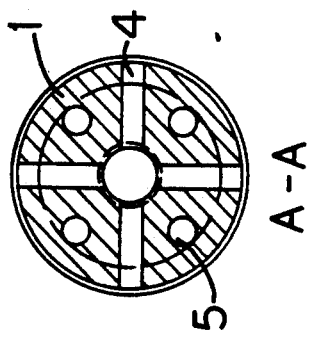
FIG. 2.
A-A

AERATION APPARATUS FOR LIQUID

FIELD OF THE INVENTION

The invention relates to an aeration apparatus for the injection of compressed air into a liquid, in particular waste water, having a tubular basic body and a flexible, perforated membrane surrounding the latter, through the perforation of which membrane the compressed air is introduced into the liquid as fine bubbles when the air is admitted via one or more radial openings in the basic body and which membrane closely envelops the basic body when the air is not being admitted, as well as having a connecting element at the end face, which element supports the basic body and connects it to a compressed air supply pipe.

BACKGROUND OF THE INVENTION

Aeration apparatuses of the abovementioned type are known, for example, from German Patent 3,319,161 or German Patent 3,819,305, in which antechamber-like gas or compressed air spaces are provided as well as so-called flooding spaces, which are separate from the gas or compressed air spaces and can be flooded by the surrounding liquid. The gas or compressed air spaces are separated from the flooding spaces by various means, for example inserted partition walls or walls which are of one part with the basic bodies. It has been found that the known designs are not mechanically robust enough for use in waste water purifying plants, often exhibiting damage in the partition wall region. They are not suitable for practical continuous operation. Subdividing the basic body into a number of chambers makes the production expenditure for the known aeration apparatuses quite high. Closed-end flooding spaces produced by partition walls form dead zones, in which no liquid exchange takes place. To overcome these disadvantages, there has already been proposed an aeration apparatus of the type mentioned at the beginning, of which the supporting connection between the basic body and the compressed air supply pipe is substantially more stable and the overall design is more simple and consequently less expensive to produce than one of the known constructions. Serving in this case as connecting element between the basic body and the compressed air supply pipe is a supporting body having at least one axially directed air supply groove, which body extends with one end into the compressed air supply pipe and engages with its free end in a supporting manner into the basic body, providing a seal against the liquid. This design is not able, however, to connect a tubular hollow body to a compressed air supply pipe which has customary pipe connection nipples.

SUMMARY OF THE INVENTION

The invention is based on the object of providing an aeration apparatus of the type mentioned at the beginning, of which the supporting connection between the basic body and the compressed air supply pipe is likewise very stable, is simple and consequently inexpensive to produce and is able without further auxiliary means to connect a basic body of the aeration apparatus without further auxiliary means to commercially available pipe nipples. In addition, it is intended thereby to avoid the formation of stagnant dead zones without liquid exchange. To achieve this object, the connecting element is designed as a cylindrical body and is provided with a central air supply opening, which has an internal thread and is connected by at least one radial opening to the space between the outer surface of the tubular basic body and the surrounding membrane, and the connecting element has at least one axially directed through-opening to create a two-sided connection of the inner space of the basic body with the surrounding liquid.

The design according to the invention reduces the connecting element to an inexpensively producible, cylindrical head piece, which can be connected in a simple way to a commercially available pipe section without further auxiliary means. A further major advantage of the invention is the buoyantless behavior of the aeration apparatus due to the absence of gas-filled or air-filled antechambers or compartments. The invention also offers the possibility of designing the connecting element and the basic body in one piece. Furthermore, the connecting element may be welded to an end face of the basic body, for example by flush welding. The connecting element can be produced in a simple way by injection molding. In the case of a one-piece design, the entire basic body may be produced together with the front part, serving as connecting element, as an injection-molded part.

Further features, advantageously developing the subject of the invention, are specified in the subclaims.

In waste water purification it is very advantageous in process engineering terms to have the connection between the inner space of the basic body, that is the flooding space, and the surrounding liquid with the liquid able to flow through, thus permitting an automatic liquid exchange and avoiding undesired microbiological reactions, such as can occur in liquid dead zones of known aeration apparatuses.

BRIEF DESCRIPTION OF THE DRAWINGS

Illustrative embodiments of the invention are explained below and are represented diagrammatically in the drawing, in which:

FIG. 1 shows the longitudinal section through a basic body fastened to an air supply pipe, in one-piece design, FIG. 2 shows the cross-section A—A through the connecting element, FIG. 3 shows the cross-section B—B through the connecting element, FIG. 4 shows the end view X of the basic body.

DESCRIPTION OF THE ILLUSTRATED EMBODIMENTS

Figure 5:
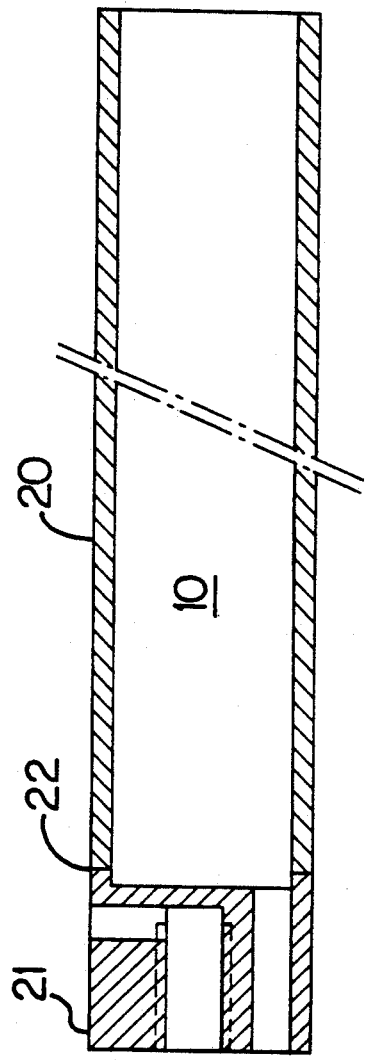
FIG. 5 shows the longitudinal section through a basic body with welded-on connecting element and FIG. 6 shows the longitudinal section through a basic body with screwed-on connecting element.
Figure 6:
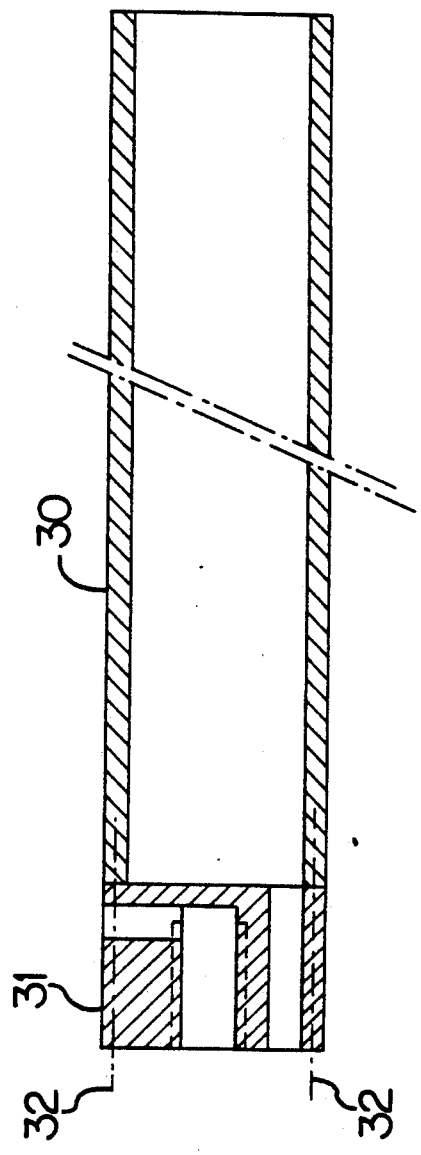

FIG. 1 shows a fitted aeration apparatus, comprising a tubular basic body 2, which is designed in one piece with the connecting element 1. The basic body is screwed onto a commercially available pipe nipple 6 of the compressed air supply pipe 7. As in the case of similar designs, the compressed air supply pipe 7 serves at the same time as a supporting element. The basic body 2 can be produced with its connecting element, designed as a head piece, by injection molding. For screwing the connecting element 1 onto the commercially available pipe nipple 6, a corresponding internal thread is provided in the central opening 3. For passage of the air from the pipe nipple 6 underneath the flexible perforated membrane 8, which extends up to the connecting element 1 to be referred to as head piece, there is provided at least one radial opening 4, which adjoins the inner end of the central air supply opening 3, having the internal thread.

At least one axial through-opening 5 in the head part 1 of the basic body 2 connects the inner space (flooding space) 10 of the basic body 2 to the surrounding liquid in the region of the compressed air supply pipe 7. As a result, a liquid exchange can take place in the inner space 10. Without a through-opening of this type, the inner space of the basic body would be a liquid dead space with process engineering disadvantages.

The perforated membrane 8 represented in FIG. 1 is fastened by tensioning clamps 9 on the basic body 2 or on its connecting element 1 and is not perforated in the region 11 over the compressed air through-openings 4.

The air flowing in forms underneath the flexible, perforated membrane 8 a bulking space, from which it passes through the perforation into the liquid as fine bubbles. Whereas, according to FIGS. 1 to 4, the basic body and the connecting element are designed in one piece, FIG. 5 shows a two-part design. In this case, a connecting element 21 is connected to a commercially available pipe section 20 by flush welding. The weld is indicated by 22.

Given adequate wall thickness of a basic body 30, a connecting element 31 can be connected to the end face with the aid of fastening screws 32, which are arranged evenly distributed over the circumference of the connecting element.

What is claimed is:

1. Apparatus for injecting compressed air into a liquid, said apparatus comprising:
   (a) means for supplying compressed air for injecting into the liquid, said compressed air supply means having at least one projecting nipple;
   (b) a tubular basic body having an exterior surface, an open end, and an opposite end, said opposite end including means for supporting said basic body and connecting said basic body to said projecting nipple on said compressed air supply means, said supporting and connecting means being of a substantially cylindrical configuration and having:
      (i) an outer surface substantially coextensive with said exterior surface of said basic body;
      (ii) opposed inner and outer ends, said inner end facing said open end of said basic body and thereby defining a flooding zone interior of said basic body between said inner end and said open end for being flooded by the liquid into which said apparatus is placed;
      (iii) a central passageway for compressed air, said passageway extending from said outer end of said supporting and connecting means and engaging said nipple on said compressed air supply means;
      (iv) one or more radial opening connected to said central passageway and extending radially through said supporting and connecting means to the outer surface thereof for the passage of compressed air therethrough; and
      (v) one or more passageways parallel to said central passageway and extending from said inner end of said supporting and connecting means to said opposed outer end, thereby connecting said interior flooding zone with the surrounding liquid and providing for the flow of liquid through said basic body; and
   (c) a flexible membrane having perforations through which compressed air is distributed into the liquid as fine bubbles, said membrane surrounding at least a portion of said exterior surface of said basic body including said one or more radial openings in said supporting and connecting means through which said membrane receives compressed air, said flexible membrane closely enveloping said basic body in the absence of compressed air, thereby substantially preventing liquid from penetrating into said perforations.

2. Apparatus of claim 1 wherein said tubular basic body comprises said opposite end and the remainder of said basic body not including said opposite end, and wherein said opposite end, including said supporting and connecting means, and the remainder of said basic body are an injection molded and indivisible unit.

3. Apparatus of claim 1 wherein said tubular basic body comprises said opposite end and a pipe having first and second open ends, said first open end of said pipe being said open end of said basic body, and said opposite end of said basic body, including said supporting and connecting means, being welded to said second open end of said pipe.

4. Apparatus of claim 3 wherein said weld is a flush weld.

5. Apparatus of claim 1 wherein said supporting and connecting means comprises a radially outer portion having internal threads being connected to a radially inner portion having external mating threads.

6. Apparatus of claim 1 wherein said radial openings extend between said parallel passageways.

7. Apparatus of claim 1 wherein said flexible membrane includes a perforated zone having perforations through which air is distributed and further comprises an unperforated zone over said radial openings.

8. Apparatus of claim 7 wherein said unperforated zone of said flexible membrane and said perforated zone are located one behind the other in the axial direction.

9. Apparatus of claim 1 wherein said nipple and said central passageway of said supporting and connecting means are engaged through mating threaded portions.

10. Apparatus for injecting compressed air into waste water, said apparatus comprising:
    (a) means for supplying compressed air for injecting into the waste water, said compressed air supply means having at least one projecting nipple;
    (b) a tubular basic body having:
       (i) an exterior surface;
       (ii) a first portion for receiving air from said compressed air source and having one or more radial openings therein for the passage of compressed air to said exterior surface; and
       (iii) a second portion including an open end for being flooded by the liquid into which said apparatus is placed;
    (c) a flexible membrane having perforations through which compressed air is distributed into the waste water as fine bubbles, said membrane surrounding at least a portion of said exterior surface of said basic body including said one or more radial openings in said first portion thereof, said flexible membrane closely enveloping said basic body in the absence of compressed air, thereby preventing waste water from penetrating into said perforations; and
    (d) means for supporting said basic body and for connecting said basic body to said compressed air supply means, said supporting and connecting means being of a substantially cylindrical configuration and having:
  (i) opposed inner and outer ends, said supporting and connecting means engaging said basic body inwardly of said basic body with said inner end facing said open end of said basic body;
  (ii) a central passageway for compressed air, said passageway extending from said outer end of said supporting and connecting means and engaging said nipple on said compressed air supply means;
  (iii) one or more radial openings in communication with said central passageway and said one or more radial openings in said first portion of said basic body for supplying compressed air from said central passageway to said membrane; and
  (iv) one or more passageways parallel to said central passageway and extending from said inner end to said opposed outer end, thereby providing for the flow of waste water through said basic body.

11. Apparatus of claim 10 wherein said tubular basic body and said supporting and connecting means are an injection molded and indivisible unit and wherein said one or more radial openings in said basic body and said one or more radial openings in said supporting and connecting means comprise one or more indivisible, unitary openings.

12. Apparatus of claim 10 wherein said basic body and said supporting and connecting means are engaged through mating internal and external threaded portions, respectively.

13. Apparatus of claim 12 wherein said supporting and connecting means is an injection molded member.

14. Apparatus for injecting compressed air into waste water, said apparatus comprising:
  (a) means for supplying compressed air for injecting into the waste water, said compressed air supply means having at least one projecting nipple;
  (b) a tubular basic body having an exterior surface and first and second open ends defining a flooding zone interior of said basic body between said first and second open ends;
  (c) means for supporting said basic body and for connecting said basic body to said compressed air supply means, said supporting and connecting means being of a substantially cylindrical configuration and having:
    (i) an outer surface substantially coextensive with said exterior surface of said basic body;
    (ii) opposed inner and outer ends, said inner end engaging said first end of said basic body and facing said second open end of said basic body;
    (iii) a central passageway for compressed air, said passageway extending from said outer end and engaging said nipple on said compressed air supply means;
    (iv) one or more radial openings connected to said central passageway and extending radially through said supporting and connecting means to the outer surface thereof for passage of compressed air therethrough; and
    (v) one or more passageways parallel to said central passageway and extending from said inner end to said opposed outer end, thereby connecting said flooding zone with the surrounding waste water and providing for the flow of waste water through said basic body; and
  (d) a flexible membrane having perforations through which compressed air is distributed into the liquid as fine bubbles, said membrane surrounding at least a portion of said supporting and connecting means including said radial openings and at least a portion of said exterior surface of said basic body, said flexible membrane closely enveloping said basic body in the absence of compressed air, thereby preventing liquid from penetrating into said perforations.

* * * * *